Aug. 11, 1964     R. E. BEINKE     3,144,405
FILTER PURGING DEVICE
Filed Aug. 30, 1961
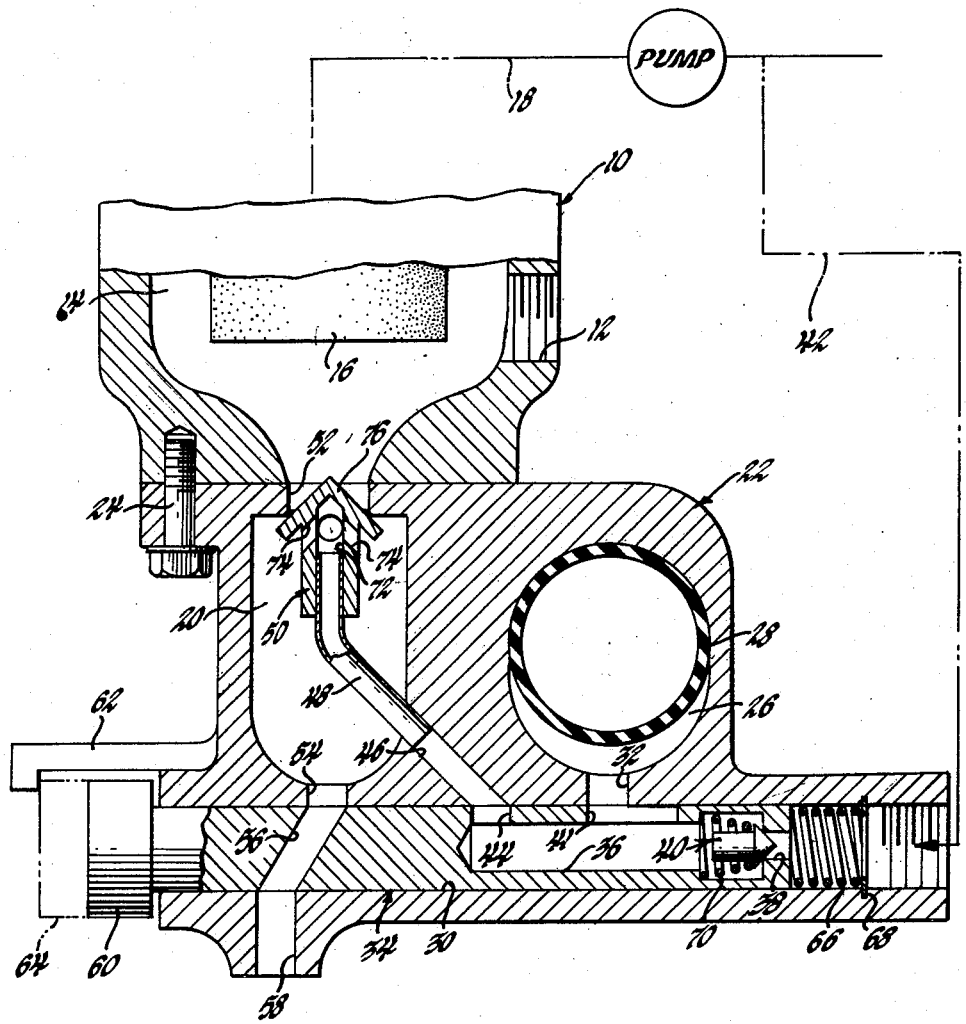
INVENTOR.
*Randall E. Beinke*
BY
*George A. Schmidt*
ATTORNEY

3,144,405
FILTER PURGING DEVICE
Randall E. Beinke, Warren, Mich., assignor to General Motors Corporation, Detroit, Mich., a corporation of Delaware
Filed Aug. 30, 1961, Ser. No. 134,959
1 Claim. (Cl. 210—117)

This invention relates to fluid systems, and more particularly to a device for purging a filter assembly in a fluid system.

In the design and manufacture of many structures utilizing fluid systems of one kind or another, a filter assembly is generally placed somewhere in the system to remove impurities from the fluid. The filter assembly is generally provided with a silt chamber or sump of some kind to collect these impurities. It is necessary from time to time to remove the impurities from the chamber or sump by purging or flushing.

Many purging or flushing devices are known which accomplish the removal function. However, the presently available devices usually require that the structure be shut down, or that the fluid in the system stop flowing, before the sump may be purged or flushed. Further, many of these known devices require large amounts of fluid to purge or flush the chamber and, in general, such devices are cumbersome, complicated and expensive to manufacture and assemble.

The device in which this invention is embodied comprises, generally, a valving accumulator system for supplying fluid to a silt chamber at any time during the operation of the structure, whether the fluid is flowing or not. The valve assembly is such that manual operation is required to purge the chamber, and after a short period of time the valve may be released to stop the purging action and return the system to normal. A small amount of fluid from the accumulator chamber is sufficient to accomplish the purging or flushing operation.

The device is relatively simple in construction and extremely easy to manufacture and assemble. It is positive in its operation and is uncomplicated both in the number of parts involved and the relative cooperation of these parts. The silt chamber may be purged or flushed at any time during the operation of the system and a small amount of fluid is all that is required to accomplish the purging.

These and other advantages will become more apparent from the following description and drawing, in which the single figure is a cross-sectional view of a fluid system filter and valve housing assembly illustrating the position of the various parts of the purging device.

Referring more particularly to the drawing, a filter housing and assembly is shown in a typical fluid system. The fluid system may be, for example, the fuel system of an internal combustion engine which requires a filtering operation prior to introduction of the fuel into the combustion chambers of the engine. In the drawing, a filter bowl or housing 10 is placed in the fuel system and has an inlet 12 permitting the entry of fluid to the filter chamber 14. A suitable filter element 16 of any conventional nature is disposed in the filter chamber 14 and serves to remove the impurities from the fluid as the fluid passes therethrough. The fluid is then conveyed upwardly through the inside of element 16 and may enter a conduit, as illustrated by dashed and dotted lines 18, to the remainder of the system. During the filtering operation, impurities that are separated from the fluid by the filter element 16 are permitted to drop or fall through the filter chamber 14 and into a suitable sump or silt chamber 20 mounted below the filter chamber 14.

Sump chamber 20 is formed in a valve and accumulator housing, illustrated generally by the numeral 22, which is disposed adjacent the filter housing 10 and may be secured thereto in any suitable manner, as by a series of bolts 24. The positioning of housing 22 is such that the silt chamber 20 is immediately below the filter chamber 14 to collect the impurities separated by the filter element 16.

Also formed in housing 22 is an accumulator chamber 26 which may take any suitable shape, and which contains a specific amount of fluid. A resilient bladder 28 may be disposed in the accumulator chamber 26 in the well known manner to pressurize the fluid disposed therein. Accumulator 26 is connected to a cross passage 30 formed in the housing 22 by a short passage 32.

A valve body, illustrated generally by the numeral 34, is disposed in the passage 30. A central bore 36 is formed in valve member 34, communicating with a passage 38 at the end thereof. Passage 38 permits the entry of fluid from the inlet of the passage 30 and permits the fluid to flow past a check valve, indicated generally by the numeral 40, through slot 41 to the passage 32 and into the accumulator chamber 26. A conventional pump is located in conduit 18. The fluid coming into the passage 30 may come from anywhere in the fuel system, as by a conduit indicated by dashed and dotted lines 42, bleeding off of conduit 18.

With valve member 34 in the position shown, central bore 36 in the valve member 34 communicates with a passage 44 in valve member 34 which leads to a passage 46 in housing 22 and extends in the direction of the silt chamber 20. Disposed in passage 46 and retained therein is a tube 48 which extends into the silt chamber 20 and terminates adjacent the entry from the filter chamber 14. Tube 48 supports a check valve, indicated generally by the numeral 50, which operates in a manner to be hereinafter described to close the communicating passage 52 between the silt chamber 20 and the filter chamber 14. At the base of silt chamber 20 is a passage 54 communicating with a passage 56 in valve member 34 and, in turn, with a passage 58 in the housing 22 which serves the purpose of draining the silt chamber 20.

One end of valve member 34 thereof is provided with an enlarged head 60 which serves as a manually operable push button. Adjacent head 60 is a stop member 62 attached to, or forming an integral part of, the housing 22 and which limits the outward movement of the valve member 34. Valve member 34 is shown in its open position. The valve member 34 is normally in the position shown by dashed and dotted lines 64, being biased in that position by a suitable spring or the like 66 disposed in the cross passage 30 and engaging valve member 34 and a suitable retaining ring 68.

The fuel in the fluid system may be pressurized, as by a fuel pump, not shown, which causes circulation of the fuel through the various passages and conduits. The pressure in the system is sufficient to overcome and open check valve 40 against the force of a spring or the like 70. This permits passage of fluid into the accumulator chamber 26. At the same time fluid pressure may tend to move valve member 34 to the left as viewed in the drawing, assisting the spring 66 to maintain the valve in its normal position.

Check valve 50 is provided with a central aperture 72 and a plurality of transverse apertures 74. Apertures or passages 74 permit fluid to flow from the central bore 72 into the silt chamber 20. The angular or conical disposition of the top 76 of the valve serves to direct the fluid outwardly and downwardly as it passes through apertures 74. This assists in proper cleaning of the silt chamber 20.

The operation of the device is as follows. During normal operation of the fluid system, valve member 34 is moved to the left, as viewed in the drawing, to the position indicated by dashed and dotted lines 64. In this position, passages 44 and 46 are out of registry, as are passages 54 and 56. Check valve 50 drops downwardly along the conduit 48 to open communicating passage 52 between the filter chamber 14 and the silt chamber 20. This permits free fall of the impurities separated from the fluid by the filter element 16. The fuel under pressure enters the cross passage 30 in housing 22 from conduit 42 and overcomes check valve 40 to permit fluid to flow through the central bore 36, slot 41 and passage 32 to the accumulator chamber 26. The accumulator chamber fills with a measured amount of fluid, at which time check valve 40 closes and the fuel system circulates fluid bypassing the device. When it is desired to purge or flush the silt chamber 20, valve 34 is manually pushed to the right, the position as shown in the drawing, bringing into registry passages 44 and 46 and passages 54 and 56. Fluid passes from the accumulator chamber 26 through the passage 32, central bore 36, passages 44 and 46, and into the conduit 48. Check valve 50 is carried upwardly by the force of the fluid to close the communication 52 between the filter bowl 14 and sump 20. Fluid is directed out of the check valve 50 through apertures 74 and washes down the chamber 20. The purging fluid then drains through passages 54, 56 and 58 to any suitable exhaust.

On completion of the purging of the chamber 20, which may take a few seconds of time, valve member 34 is released, closing the drain 54 and passage 46 and permitting the check valve 50 to open. The system is thus restored to its normal condition and the cycle is repeated when necessary.

Thus, a purging or flushing device is provided which may be operated either while the fluid is circulating in the system or after the circulation has stopped. The device is relatively uncomplicated and inexpensive to manufacture and assemble, and is positive in its operation.

What is claimed is:

In a pressurized fluid system having a filter housing containing a filter chamber, a silt chamber, a communicating passage between said filter chamber and said silt chamber and a filter element in said filter chamber, a purging device comprising:

- a fluid storage chamber in said housing;
- fluid pressurizing and volume limiting means in said storage chamber;
- a first passage for conveying filtered fluid under pressure to said storage chamber;
- a check valve in said first passage having an open position permitting ingress of fluid to said storage chamber and movable to a closed position preventing the ingress of fluid to said storage chamber upon the attainment of a predetermined charge of fluid in said storage chamber;
- a valve chamber in said housing;
- a second passage connecting said storage chamber with said valve chamber;
- a third passage connected through said valve chamber to said second passage and connecting said valve chamber with said silt chamber;
- a silt chamber drain passage in said housing;
- a second valve member in said valve chamber having means biasing said second valve to a first position preventing communication between said second and third passages and closing said drain passage, said second valve having means for moving said second valve to a second position permitting communication between said second and third passages and opening said drain passage; and
- a third valve in said communicating passage having means for moving said third valve to a first position permitting communication between said filter chamber and said silt chamber and having means responsive to fluid pressure in said third passage for moving said third valve to a second position preventing communication between said filter chamber and said silt chamber.

References Cited in the file of this patent
UNITED STATES PATENTS

| | | |
|---|---|---|
| 1,967,909 | Sonner | July 24, 1934 |
| 2,878,969 | Griswold | Mar. 24, 1959 |
| 2,893,925 | Victor | July 7, 1959 |